United States Patent

Simon

[15] 3,681,532

[45] Aug. 1, 1972

[54] RESTRICTED DIAL TELEPHONE STATION

[72] Inventor: Günther Simon, Weissach, Germany

[73] Assignee: International Standard Electric Corporation, New York, N.Y.

[22] Filed: Jan. 9, 1970

[21] Appl. No.: 1,708

[30] Foreign Application Priority Data

Jan. 5, 1969 Germany.............P 19 01 692.3

[52] U.S. Cl. ..............................179/6.3 R, 179/90 D

[51] Int. Cl. ............................................H04m 17/02

[58] Field of Search..................179/90 D, 18 BD, 6.3

[56] References Cited

UNITED STATES PATENTS 2,206,147 7/1940 Zimmermann................179/6.3

FOREIGN PATENTS OR APPLICATIONS 383,166 4/1932 Great Britain..............179/90 D 478,229 4/1937 Great Britain..............179/90 D

*Primary Examiner*—Kathleen H. Claffy
*Assistant Examiner*—Thomas D'Amico
*Attorney*—C. Cornell Remsen, Jr., Walter J. Baum, Percy P. Lantzy, J. Warren Whitesel, Delbert P. Warner and James B. Raden

[57] ABSTRACT

Equipment is provided for blocking certain coin box and other dial telephones with respect to certain call numbers and certain types of traffic. Mechanical means are employed to interrupt selected calls, permitting the dial to be operated but not initiating a connection to the central switching office.

4 Claims, 4 Drawing Figures

RESTRICTED DIAL TELEPHONE STATION

Figure 1:
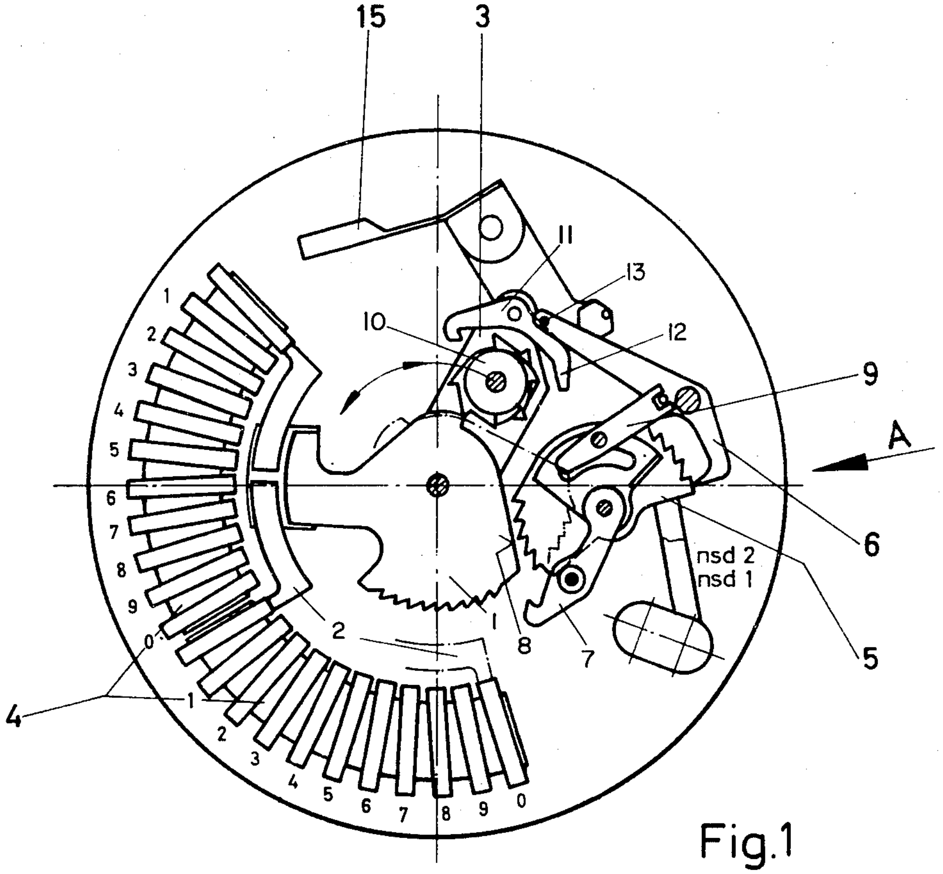

The present invention relates to an arrangement for controlling the establishment of a connection in telecommunication and, more particularly, in telephone systems from a coin-box station, and particularly to a call-number intercept device to prevent completion of certain classes of calls. The dialled succession of digits, or a part thereof, is stored in the intercept device. The stored digits are compared with a given sequence of intercept digits and, in the event of an agreement between the dialled and the given sequence of digits, connection is prevented from being established.

From the German Pat. No. 967 314 there is known an intercept dial switch for coin-box stations employing a call number intercept device of the type described hereinbefore.

For each level of a sequence of digits to be intercepted there is provided one current-leak and one current-feed rail, as well as a contact rail or bar comprising individual contacts for each digit of a level, between which there is moved a switch member capable of being actuated by the dial switch.

Known types of coin-box stations, such as the coin-box station 56 as officially introduced (in Germany), which are provided with the intercept dial switch of the type described hereinbefore, however, can only be used for local traffic and for national toll dialling purposes.

Since facilities for direct toll dialling are required to an increasing extent, and also become more and more available in international toll dialling, further coin-box stations must be capable of coping with this type of traffic on one hand, and the coin-box stations already in use must be re-arranged or modified, on the other hand, respectively.

It is the object of the present invention to provide an arrangement of the type mentioned hereinbefore, for coin-box stations, permitting future coin-box stations to be manufactured with the aid of simple and less expensive means for all types of traffic, or make existing coin-box stations suitable for use with all types of traffic respectively.

According to the present invention these problems are solved in that, in a coin-box station which has been admitted and equipped for both national and international toll dialling, the call intercept device is associated with switching means which, upon dialling the access numbers identifying the type of traffic, serve to evaluate same, and prevent them from being stored in the call intercepting device, and which serve to control the setting of further devices in the coin-box station and/or at the exchange in dependence upon the evaluation result.

According to one advantageous type of embodiment of the invention relating to conventional types of coin-box stations employing a mechanical type of intercept dial switch it is provided that the first tooth segment which is actuated upon winding up the dial switch will actuate a two-armed lever with its front edge only upon selection of an access number, with this lever lifting one ratchet pawl of the level engaging segment, that thereupon the level engaging segment will return to normal and, simultaneously, a second pawl will release the first tooth segment, and that upon returning of the dial switch and of the rotary wiper, the pawl of a switch gear pillar will meet upon a pin of the extended lever of the ratchet pawl, and that the level contact (nsdl), the first tooth segment (1), and the switch gear pillar (10) will all return to normal.

This solution offers the advantage that, although there is provided an increase in the number of the dialled digits by partly multi-digit or-position access numbers, there do not need to be provided any further mechanical and, consequently, more expensive level stores.

At the same time, by a further embodiment of the inventive arrangement comprising switching means which, in accordance with the dial access number and upon winding-up of the dial switch, respond via temporarily closed contacts of the intercept field, with the contacts of these switching means serving to prepare an operating circuit for a switching means aimed at preventing the establishement of the connection in accordance with a call number stored in the intercept field, there is safeguarded a simple and reliable way of preventing unauthorized connections from being established.

The necessary re-arranging functions are achieved in that further contacts of the switching means actuated in accordance with the dialled access number serve to set the coin-collecting device of the coin-box station to the collecting sequence corresponding to the respective type of connection (local, national, international).

If, as a result of technical progress, the chiefly mechanical dial switches should be replaced by key or push-button type selecting devices, and the mechanical intercept field should no longer be capable of coping with the increased dialling or selecting speed, it is proposed in accordance with a further embodiment of the invention, to provide an electronic type of call intercepting device, to the intercept field of which there are connected the dialling keys and in which, moreover, the dialling keys are connected to a traffic category switch which, upon dialling the access numbers, interrupts the transfer of these digits to a subsequently arranged level switch, that the traffic category switch serves to transmit a signal corresponding to the dialled access number, into the intercept field, that the dialled digits following the access number, via the traffic category switch which has been through-connected subsequently to the reception of the access number, and via corresponding outputs of the level switch which is capable of being advanced in a step-by-step manner, are applied to the intercept field, and that coincidence switching means as contained in the intercept field, when the signal as coming from the dialling keys, the signals as transmitted by the traffic category switch (local, national, international), and the signals as transmitted by the level switch are in agreement with the intercept digit or sequence of intercept digits as stored in the intercept field, produce a compulsory disconnect signal.

Figure 2:
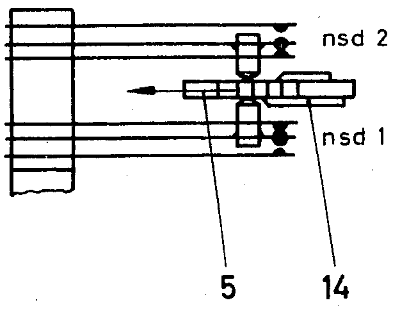
Figure 3:
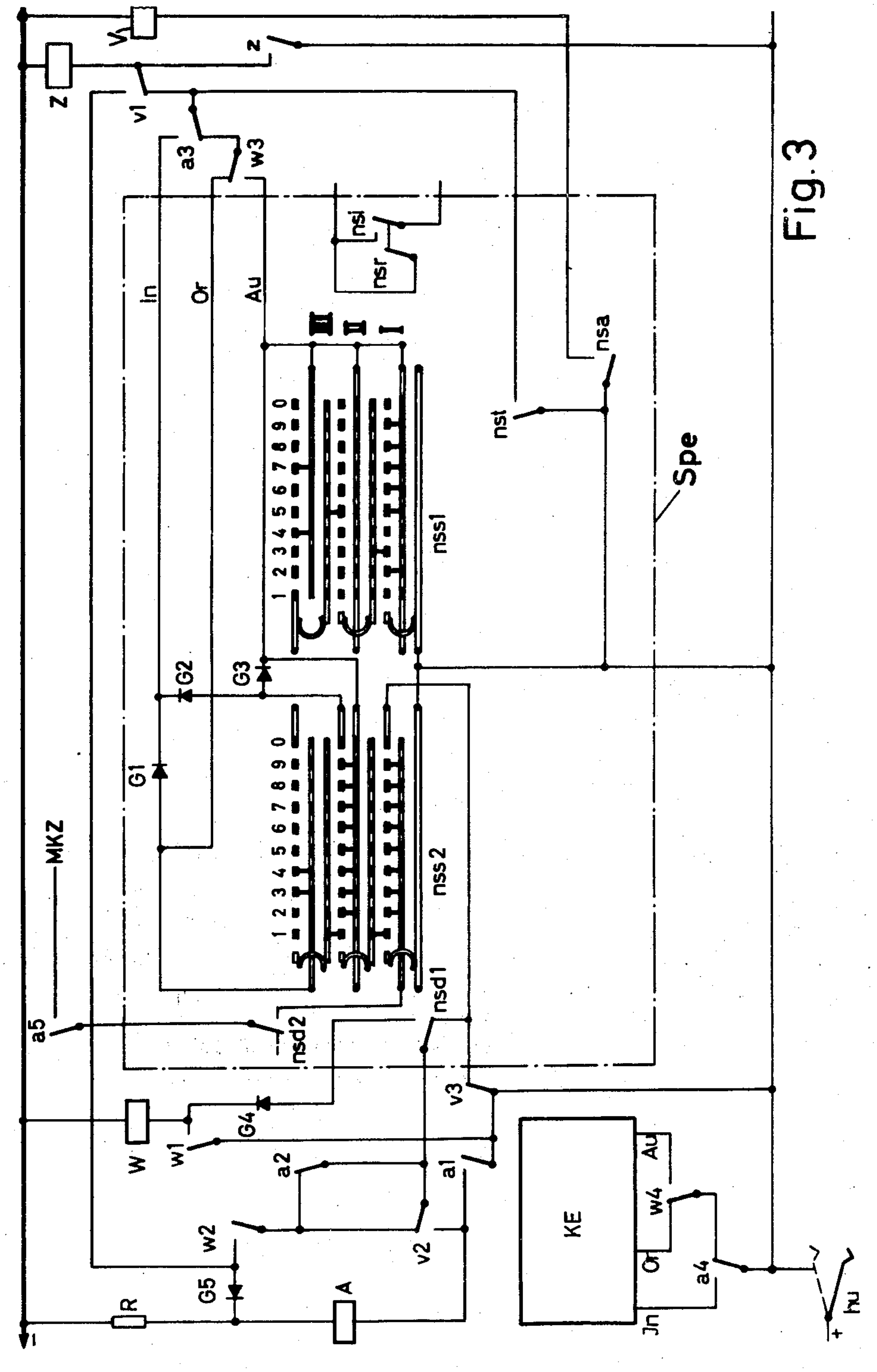
Figure 4:
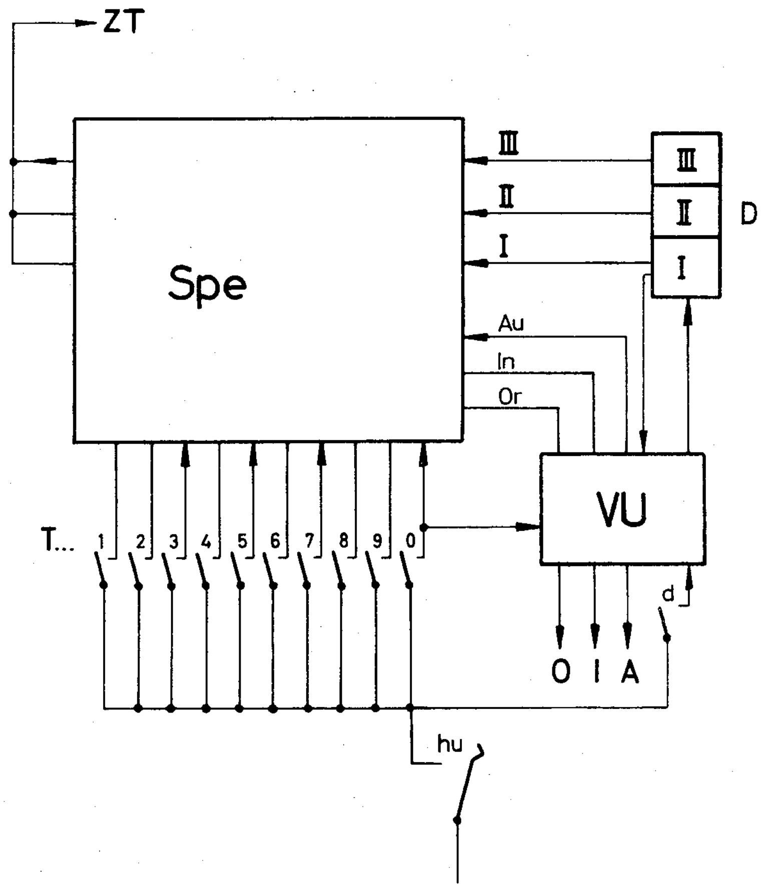

In the following the invention will now be explained with reference to FIGS. 1 to 4 of the accompanying drawings, in which:

FIG. 1 shows a section taken through the first level of the call intercepting device of a dial switch, FIG. 2 shows as a section of FIG. 1, the arrangement of the level contacts in relation to the level engaging segment, FIG. 3 shows an extract from a circuit diagram for rearranging a coin-box station to different types of traffic, and FIG. 4 shows a block diagram of the call intercepting device employing electronic components.

In FIG. 1, upon the first winding-up of the dial switch, the first toothed segment 1 carrying the two sliding contacts 2, through action of the wiper 3, is caused to engage the position of the first level of the intercept fields 4 corresponding to the first dialled digit or number, which may be an access number such as zero, the national (German) access number. At the beginning of the wind-up, and via a pawl (not shown), the level engaging segment 5 is advanced by one step, so that the ratchet pawl 7 will engage the first tooth segment 1 by the action of a spring. In the intercept dial switch shown in FIG. 1, however, the first tooth segment is so designed that upon reaching the position 0, the front edge 8 of this first tooth segment 1 will actuate the two-armed lever 9 which is in a form-locking (positive) connection with the ratchet pawl 6 of the level engaging segment, and the lever 9 will cause the ratchet pawl 6 to come out of engagement with the level engaging segment 5. On account of this the level engaging segment 5 will return to normal, thus also causing the ratchet pawl 7 to be brought out of engagement with the first tooth segment 1. During the rundown of the dial switch the wiper 3 and also the first tooth segment are both returned to normal.

Moreover, at the beginning of the wind-up of the dial switch, the switch gear pillar 10 is turned forward by one step, and the pawl 11 on the wiper 3 engages the first tooth of the switch gear pillar 10.

During the already mentioned return movement of the wiper 3, the extension 12 of the pawl 11 meets against a pin 13 on the extended lever of the ratchet pawl 6, because this ratchet pawl, already after the described jumping back of the level engaging segment 5, reset with its point end on the outside radius of the level engaging segment 5. In this way the pawl 11 is lifted out of the first tooth of the switch gear pillar 10, which, by spring action, jumps back to its initial position. In this way the switching mechanism and the blocking device are returned to normal, i.e., the access number zero is prevented from being stored.

The described processes are repeated as soon as a second 0 is dialled while establishing an international call.

If, by the first wind-up of the dial switch, there is dialled a different digit, a resetting is suppressed, because the front edge 8 of the first tooth segment 1 is prevented from reaching the two-armed lever 9. Accordingly, the dialled digit is stored into the first level of the intercept field 4.

As soon as the handset is restored or goes on hook, the resetting of the mechanism of the dial switch is achieved via a releasing lever 15.

The level contact *nsd* 1 as shown in FIG. 2 is actuated upon the first wind up of the dial switch, i.e., the level engaging segment 5 is advanced by one step in the direction as indicated by the arrow. In so doing, the cam 14 as arranged on the level engaging segment 5, switches the level contact *nsd* 1 into the operative position. As already mentioned hereinbefore, it is dependent upon the dialled digit, i.e., 1 to 9 or 0, whether the operative condition of the contact *nsd* 1 is maintained, or whether the contact *nsd* 1, upon release of the level engaging segment 5, is permitted to return to normal.

The relays A and W as shown in FIG. 3 serve to control the call intercepting device as well as the coin collecting device KE in dependence upon the dialled digits, in particular upon the dialled access digits (access code). In the known way the relay V is arranged to follow the contact *nsa*.

The compulsory disconnection is shown in a simplified way by the relay Z, and the lifting or replacing of the handset is indicated by the contact *hu;* relative thereto all details which are not absolutely necessary for understanding the invention, have been omitted.

The mode of operation will now be described with reference to one example each relating to local traffic, national toll dialling, and international toll dialling traffic.

In local traffic the compulsory disconnection, for example, is to be effected upon dialling the call number 114.

At the beginning of the first wind-up of the dial switch, the contact *nds* 1, as also described with reference to FIG. 2, is closed. Since the second of the dialled digits is no zero, the contact will remain in this position until the handset goes on hook. The relays A and W remain at normal. Upon winding up the dial switch, the sliding contacts in the level I of the contact banks of the intercept field, *nss* 1 and *nss* 2 are in position 1 corresponding to the dialled digit 1. Upon the second and the third wind-up of the dial switch, the sliding contacts, according to the second digits 1 and 4, will assume the positions 1 and 4 in the levels II and III of the contact banks associated with the intercept field. By the soldering bridges in positions 1 of the levels I and II, as well as in position 4 (and 3 corresponding to the intercept digits 113) of level III of the intercept field contacts *nss*2, the following circuit for the disconnecting relay Z is completed after the return or rundown of the dial switch:

1. plus, closed contact *hu*, *nss* 2 I 1, *nss* 2 II 1, *nss* 2 III 4, connection Or, break contact *w*3, break contact *a*3, break contact *v*1, relay Z, minus.

In national toll dialling the compulsory disconnection is supposed to be effected upon dialling of the call number 0114. (According to FIG. 3, also the call numbers 010 and 0113 are intercepted).

Upon dialling the access code 0, via the contact *nsd* 1 which, as described with reference to FIGS. 1 and 2, has returned to normal, and via the sliding contact of the first level I of the intercept field contacts *nss* 2 which, during the wind-up of the dial switch, was only temporarily brought into the position 0, there is energized the relay A:

2. plus, closed contact *hu*, temporarily closed contact *nss* 2 I 0, break contact *nsd* 1, make contact *v*2, relay A, R, minus. The relay A holds itself via its own contact *a*1.

Since, upon the second wind-up of the dial switch, the contact *nsd* 1 is reactuated, also relay W operates after energization of the relay V:

3. plus, closed contact *hu*, *a*1, make contact *v*2, make contact *nsd* 1, diode G4, relay W, minus.

After the running-down of the dial switch, the relay W remains energized via its own contact *w* 1.

The digit one as dialled during the second wind-up of the dial switch, as well as the further digits 1 and 4, are stored in the intercept field as already described hereinbefore.

The operating circuit for the disconnecting relay Z, in deviating from the described circuit relating to local traffic, extends behind the intercept field contacts *nss* 2, via the diode G1 in the branch In, and the make contact *a*3.

If, instead of an intercepted call number, there is dialled an admitted call number, such as 02 . . . ., then, via the sliding contact in the first level I, via the corresponding contact *nss* 2/I 2 of this level, and via the make contact *a*5, there is transmitted the well known coin-box station identification MKZ. At the same time, via the make contact *a*4 of relay A, plus potential used as the marking or identification potential, is applied to the input In of the coin-collecting device for initiating there the corresponding switch-on or re-arranging processes.

As an example relating to the compulsory disconnection in the case of international toll dialling, there is chosen the intercepted call number 00357. (Besides this, according to FIG. 3, there are also intercepted the call numbers 0010, 0012 . . . . 0019, 002, 005 . . . . 009 and 00354).

Following the first wind-up of the dial switch and the dialling of the first access code zero, relay A will respond in circuit (2) as already described with reference to national toll dialling.

Upon dialling the second access code zero, relay W will respond in circuit (3) as likewise already stated hereinbefore. Since upon this second zero, the contact *nsd* 1, after reaching the position 0 of the call intercepting dial switch, will again return to normal, relay A is short-circuited upon deenergization of relay V (normal position of the dial switch), and will drop off.

4. plug, closed contact *hu*, break contact *v*3, break contact *nsd* 1, break contact *v*2, closed contact *w*2, diode G5, R, minus.

If, subsequently thereto, there are dialled the remaining digits of the call number, these will be stored in the intercept field Sp*e*, particularly in the banks of intercept field contacts *nss* 1.

Since soldering bridges or jumpers are each time provided at the digits 3, 5 and 7 in the levels I, II and III, the disconnecting relay Z is energized in the circuit:

5. plus, closed contact *hu*, *nss*1 I 3, *nss*1 II 5, *nss*1 III7, make contact *w*3, break contact *a*3, break contact *v*1, disconnect relay Z, minus.

When dialling a non-intercepted call number in the course of international toll dialling, and correspondingly via the break contact *a*4 and the make contact *w*4, the coin-collect device will receive a connecting criterion at its input A*u*, and is set accordingly.

If, for example, as the third digit following the access code relating to international toll dialling, there is erroneously again dialled a zero, then the operation of the disconnect relay is effected within the circuit:

6. plus, closed contact *hu*, *nss* 2 I 0, break contact *nsd* 1, break contact *a*2, closed contact *w*2, make contact *v*1, disconnect relay Z, minus.

In the block diagram as shown in FIG. 4, there is supposed to be started out from the face that, by maintaining the hitherto described basic function of the call intercepting device, the mechanical and electromechanical components are replaced, for example, by electronic units which, for instance, would be necessary in the case of coin-box stations which, instead of with a dial switch, are equipped with a set of dialling or selecting push-button keys, and in which the mechanical or electromechanical parts or components, amongst others, are no longer suitable for coping with the possible increased dialling speed.

In this case the intercept field Sp*e*, according to FIG. 4 substantially corresponds to the intercept field Sp*e* in FIG. 3. The level switch D including the levels I, II and III corresponds to the mechanical switching mechanism of the call number intercept device which is mechanically built into or attached to the dial switch of the substation set, according to FIG. 2.

The traffic category switch V*u* substantially performs the function of the relays A and W in FIG. 3.

For example, it be assumed that the call number 00357 is intercepted whereas the call numbers 0357 and 357 are admitted.

Accordingly, when dialling the digit zero the contacts TO and *d* are closed, with the contact *d* corresponding to the contact *nsa* in FIG. 3.

Via the contact TO, in the case of a closed contact *hu*, the traffic category switch V*u* is switched over from local traffic to national toll dialling traffic. In so doing, the first level I of the level switch D is prevented from being switched on in the case of a simultaneous actuation of the two contacts TO and *d;* accordingly, the digit zero is not fed into the intercept field Sp*e*. Upon dialling the second digit zero, the traffic category switch V*u* switches from national toll dialling to international toll dialling. Only upon dialling the digit three, there is switched on the level switch in the first level I. Via the inputs 3 of the key assembly, I of the level switch D, and A*u* of the traffic category switch V*u*, there is effected the setting of the intercept field Sp*e*.

Upon response of the first level I there is effected the blocking of the traffic category switch V*u* in order to maintain, in the event of dialling a further digit, the reached condition, i.e., in this case that of "international toll dialling."

In an analogous way, the digits five, via the input 5 in the simultaneous presence of the information "international" at the input A*u* and level II at the input II, as well as the digit 7 via the input 7 in the simultaneous presence of the information "international" at the input A*u* and level III at the input III, are fed into the intercept field.

In the intercept field, via not shown coincidence switching means, the fed-in sequence of digits is compared with both the stored intercept digit "international," corresponding to the access code 00, and the dialled digits 357, and via the output ZT of the intercept field there is transmitted the instruction for effecting the compulsory disconnection.

Since, upon dialling the sequence of digits 357 or 0375, the stored identification "international toll dialling" is not in agreement with the identification "local traffic" as provided by the traffic category switch V*u* at the input Or, nor with the identification "national toll dialling" as appearing at the input In, the coincidence switching means are prevented from responding, so that in this case there will not be effected a compulsory disconnection.

The outputs O, I and A of the traffic category switch V*u* are applied, in accordance with the showing of FIG. 3, to a not shown coin-collecting device KE.

It is still to be mentioned that, by way of a simple jumpering, it is also possible to make arrangements for other digits to serve as the access code.

I claim:

1. An arrangement for controlling the establishment of connections in telephone systems from a coin-box station equipped with a call number intercept device comprising means for storing a sequence of dialled digits, means for comparing said sequence with a previously given sequence of blocked digits, and means for preventing a connection from being completed in cases where the sequence of dialled digits is in agreement with the sequence of the previously given sequence of blocked digits, said coin-box telephone station including means for initiating national and international toll dialling connections, the call number intercept device further comprising switching means responsive to an access code identifying the type of traffic, means to evaluate the access code, means preventing the access code from being stored in the means for storing, and means serving to control the setting of further equipments within the coin-box station and at the exchange in dependence upon the result of such evaluation.

2. An arrangement according to claim 1, in which the call number intercept device is mechanically built into the dial switch of the substation set, the device includes a first tooth segment, the device being actuated upon the wind-up of the dial switch, and responding to dialling of an access code to actuate a two-arm lever which, in turn, lifts a ratchet pawl of the level engaging segment, that thereupon said level engaging segment is returned to normal and, simultaneously, a second pawl releases said first tooth segment, and that upon return of both the dial switch and the wiper, the pawl of a switch gear pillar runs on to a pin forming part of the extended lever of said ratchet pawl, and the level contact, said first tooth segment, and said switch gear pillar all return to normal.

3. An arrangement according to claim 2, in which switching means are provided which, in accordance with the dialled access code upon winding up of the dial switch, and via temporarily closed contacts of the intercept field, are caused to respond, and contacts associated with said switching means are used to prepare an operating circuit for a switching means which serves to prevent the connection from being established in accordance with a call number as stored in said intercept field.

4. An arrangement according to claim 3, in which further contacts as associated with the switching means actuated in accordance with the dialled access code, serve to set the coin-collect device of the coin-box station to a coin-collecting sequence corresponding to the respective type of traffic.

* * * * *